(12) United States Patent
Harper (10) Patent No.: US 11,423,670 B2
(45) Date of Patent: Aug. 23, 2022

(54) VEHICLE OCCUPANT DETECTION SYSTEM (71) Applicant: Ernest Harper, Henderson, NV (US)

(72) Inventor: Ernest Harper, Henderson, NV (US)

(*) Notice: Subject to any disclaimer, the term of this patent is extended or adjusted under 35 U.S.C. 154(b) by 321 days.

(21) Appl. No.: 16/869,755

(22) Filed: May 8, 2020

(65) Prior Publication Data
US 2021/0350154 A1 Nov. 11, 2021

(51) Int. Cl.
G06K 9/00 (2022.01)
G06V 20/59 (2022.01)
G08B 21/02 (2006.01)
G08B 25/12 (2006.01)
G08B 7/06 (2006.01)
H04N 5/225 (2006.01)
B60R 11/04 (2006.01)
B60Q 9/00 (2006.01)
B60R 11/02 (2006.01)
G06V 40/16 (2022.01)
(Continued)

(52) U.S. Cl.
CPC ............ *G06V 20/593* (2022.01); *B60Q 9/00* (2013.01); *B60R 11/0217* (2013.01); *B60R 11/0247* (2013.01); *B60R 11/04* (2013.01); *G06V 40/172* (2022.01); *G08B 7/06* (2013.01); *G08B 21/02* (2013.01); *G08B 25/12* (2013.01); *H04N 5/2253* (2013.01); *B60R 21/01538* (2014.10); *B60R 2011/0012* (2013.01)

(58) Field of Classification Search
CPC ...... G06V 20/593; G06V 40/172; B60Q 9/00; B60R 11/0217; B60R 11/0247; B60R 11/04; B60R 21/01538; B60R 2011/0012; G08B 7/06; G08B 21/02; G08B 25/12; G08B 21/22; G08B 21/24; G08B 13/19647; G08B 25/016; H04N 5/2253; H04N 5/2252
USPC .......................................................... 382/118
See application file for complete search history.

(56) References Cited

U.S. PATENT DOCUMENTS 7,081,811 B2 7/2006 Johnston
8,038,213 B2 10/2011 Owens
8,810,384 B1 8/2014 Bowman
(Continued)

FOREIGN PATENT DOCUMENTS

CA 3087256 A1 * 7/2019 ......... G06K 9/00288
CA 3087506 A1 * 8/2019 ............ G06F 21/36
(Continued)

Primary Examiner — Mahendra R Patel (57) ABSTRACT

A vehicle occupant detection system includes a housing. A microprocessor is mounted in the housing and is programmed to detect an engine engagement status of a vehicle. A camera is mounted on the housing and is directed forward of the housing. The camera electrically coupled to the microprocessor is programmed with facial recognition software to compare facial images against images captured by the camera. A motion sensor mounted on the housing detects motion forward of the housing. The camera captures an image when the motion sensor detects motion. A first condition is defined when the motion sensor detects motion, the camera captures an image prompting a facial recognition match and the microprocessor detects the vehicle is parked. A sound emitter is mounted on the housing and is electrically coupled to the microprocessor and emit a low decibel sound when the first condition is first attained.

14 Claims, 6 Drawing Sheets (51) Int. Cl.
*B60R 21/015* (2006.01)
*B60R 11/00* (2006.01)

(56) References Cited

U.S. PATENT DOCUMENTS

| | | | | |
|---|---|---|---|---|
| 10,777,070 | B1 * | 9/2020 | Holder | B60R 25/1009 |
| 11,257,348 | B1 * | 2/2022 | Hughes | G08B 3/10 |
| 2003/0098792 | A1 * | 5/2003 | Edwards | G08B 21/24 |
| | | | | 340/568.1 |
| 2006/0244828 | A1 * | 11/2006 | Ho | B60R 1/008 |
| | | | | 348/42 |
| 2010/0078978 | A1 * | 4/2010 | Owens | G08B 21/22 |
| | | | | 297/250.1 |
| 2016/0330570 | A1 * | 11/2016 | Reed | G01S 11/06 |
| 2016/0347278 | A1 * | 12/2016 | Bibbs, Jr. | G08B 21/24 |
| 2017/0011257 | A1 * | 1/2017 | Mikhael | G06V 10/52 |
| 2017/0245125 | A1 * | 8/2017 | Child | H04W 4/12 |
| 2017/0283086 | A1 * | 10/2017 | Garing | B64D 45/0051 |
| 2018/0222490 | A1 * | 8/2018 | Ishihara | B60K 35/00 |
| 2018/0234496 | A1 * | 8/2018 | Ratias | A63F 13/60 |
| 2019/0056230 | A1 * | 2/2019 | Hatav | G08G 1/096791 |
| 2020/0265526 | A1 * | 8/2020 | Ogunsusi | G06Q 50/265 |

FOREIGN PATENT DOCUMENTS

| | | | | |
|---|---|---|---|---|
| CA | 3069208 A1 * | 7/2020 | | E05F 15/77 |
| JP | 2004289523 A * | 10/2004 | | G06F 21/36 |
| JP | 3888180 B2 * | 2/2007 | | E05F 15/77 |
| WO | WO2014032886 | 6/2014 | | |

* cited by examiner

FIG. 7

VEHICLE OCCUPANT DETECTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle occupied warning device and more particularly pertains to a new vehicle occupied warning device for alerting a driver of a vehicle that a child is in the backseat of a vehicle.

(2) Description of Related Art Including Information Disclosed Under 37 CFR 1.97 and 1.98

The prior art relates to vehicle occupied warning devices used to sound an alarm when a child has been accidently left in a vehicle.

BRIEF SUMMARY OF THE INVENTION

An embodiment of the disclosure meets the needs presented above by generally comprising a housing. A microprocessor is mounted in the housing and is programmed to detect an engine engagement status of a vehicle. A camera is mounted on the housing and is directed forward of the housing. The camera is electrically coupled to the microprocessor and is programmed with facial recognition software to compare facial images against images captured by the camera. A motion sensor is mounted on the housing and detects motion forward of the housing. The camera captures an image when the motion sensor detects motion. A first condition is defined when the motion sensor detects motion, the camera captures an image prompting a facial recognition match and the microprocessor detects the vehicle is parked. A sound emitter is mounted on the housing and is electrically coupled to the microprocessor and emit a low decibel sound when the first condition is first attained.

There has thus been outlined, rather broadly, the more important features of the disclosure in order that the detailed description thereof that follows may be better understood, and in order that the present contribution to the art may be better appreciated.

There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

With reference now to the drawings, and in particular to FIGS. 1 through 7 thereof, a new vehicle occupied warning device embodying the principles and concepts of an embodiment of the disclosure and generally designated by the reference numeral 10 will be described.

As best illustrated in FIGS. 1 through 7, the vehicle occupant detection system 10 generally comprises a housing 12. The housing 12 may have any conventional shape useful for mounting within a vehicle 14, however, the housing 12 will have a front side 16, in particular. The housing 14 will typically have a length and width each being less than about 10.0 inches and a depth less than 2.0 inches. A conventional microprocessor 18 is mounted within the housing 12. The microprocessor 18 is in electrical communication with a memory module and other conventional circuits as typically found in personal electronic communication devices. A memory slot 20 may be mounted on the housing 12 for accessing a memory card reader 22 to allow programming to be added to the microprocessor as needed. Alternatively, the memory slot 20 may comprise, or the system 10 may also include, a conventional data port. A power source, such as a battery 24, is mounted on the housing 12 and is electrically coupled to the microprocessor 18. The battery 24 may be a rechargeable battery of any conventional configuration.

The microprocessor 18 is programmed to detect an engine engagement status of the vehicle 14. This may take any conventional form. For an example, typically a global positioning system (GPS) 26 will be mounted in the housing 12 and is electrically coupled to the microprocessor 18. When the GPS 26 detects a stoppage of movement of the vehicle 14 for a predetermined amount of time, such as more than at least 45 seconds, the microprocessor 18 will determine that the vehicle 14 is no longer being driven. In another example, the system 10 may employ a short range wireless communicator 28 electrically coupled to the microprocessor 18 which employs any known short range protocol such as, for instance, Bluetooth. The short range wireless communicator 28 may communicate directly with the vehicle 14 or a personal computing device 30 which is in communication with the vehicle. The personal computing device 30 may include, most typically, a cellular phone having an application thereon for controlling and communicating with the system 10. Utilizing wireless communication, the vehicle 14 can signal to the microprocessor 18 that the vehicle 14 has either been placed in park or that the engine has been turned off. The engine engagement status of the vehicle 14 may be therefore defined in multiple ways depending on the configuration of components utilized by system 10.

A camera 32 is mounted on the housing 12 and is directed forward of the housing 12. The camera 32 is electrically coupled to the microprocessor 18 and the microprocessor 18 is programmed with facial recognition software to compare facial images against images captured by the camera 32. A motion sensor 34 is mounted on the housing 12 and is configured to detect motion forward of the housing 12. When the motion sensor 34 detects motion, the camera 23 will capture an image to compare the image to stored images. The motion sensor 34 may including a motion indicating light to indicate that the motion sensor 34 is detecting motion and that the camera 32 capturing images.

The microprocessor 14 is programmed in association with a plurality of conditions. A first condition is defined when the motion sensor 34 detects motion, the camera 32 captures an image prompting a facial recognition match, and the microprocessor 14 detects that the vehicle is parked. The term "parked" in this instance may include the transmission of the vehicle 12 being placed in park, the vehicle has been turned off or the vehicle has not moved for the predetermined amount of time. Generally, the microprocessor 14 will instruct the camera 32 to capture an image when it is detected that the vehicle is parked. Thus, if the image captured does not prompt a facial recognition match, the first condition will not be met. The microprocessor 14 may be programmed such that multiple images are captured continuously such that images leading up to and beyond the parking determination will be available. Thus, the facial recognition match be determined within a time frame, such as anytime between 30 seconds before and 30 seconds after the parking detection is made.

A sound emitter 36 is mounted on the housing 12 and is electrically coupled to the microprocessor 18. The sound emitter 36 emits a low decibel sound when the first condition is first attained. In some embodiments a second condition is defined after the first condition has been maintained for a first pre-selected amount of time and the system 10 has not been reset into standby mode. The fire pre-selected amount of time will typically be between 15 seconds and 45 seconds. A user may input a signal, which may be verbal, direct actuating or remote actuating to reinitiate the first pre-selected amount of time. Typically the microprocessor 14 will be programmed to only allow a one or two re-initiations. The sound emitter 36 emits a medium decibel sound when the second condition is attained. A reset button 38, operationally coupled to microprocessor, may be utilized to place the system in standby mode during any condition.

In one embodiment, an alert condition is defined after the second condition has been maintained for a second preselected amount of time, which is between 15 seconds and 45 seconds. The sound emitter 36 emits a high decibel sound when the alert condition is attained. In another embodiment, there is only a first condition and an alert condition without an intervening second condition. In such an embodiment the first-pre selected time will typically be longer than 30 seconds, and more preferably greater than 45 seconds. With respect to the decibel levels, these may be programmed as required and may be altered by user preferences. Typically the low decibel level will be less than 60 decibels, the medium decibel level will be greater than 60 decibels and less than 80 decibels and the high decibel level being greater than 80 decibels.

A standby condition is defined when a facial recognition match is nil after the first condition is attained. When the first condition is initiated, the camera 32 will continue to capture images to determine if a person is seated in front of the camera 32 who matches a stored image. If the person is not detected after multiple images are captured, the standby condition will then be initiated. However, a user of the system 10 may manually engage the standby condition either remotely on their cellular phone or directly on the housing 12. The standby condition resets the system 10 to prevent the first, second and alert conditions until the microprocessor detects the vehicle 14 is being driven again at which time the camera 32 will again begin to capture images.

A light emitter 40 configured to emit a strobing light is mounted on the housing 12 and is electrically coupled to the microprocessor 18. The light emitter 40 may be provided with two strobe lights wherein one is low intensity and the second is high intensity. The light emitter 40 is turned on when the alert condition has been met, though if a low intensity light is utilized, such may be turned on during the second condition or, possibly, the first condition.

A temperature sensor 42 is electrically coupled to the microprocessor 18 and is mounted on the housing 12. The alert condition is initiated when the temperature sensor 42 detects a threshold temperature and the first or second conditions have been met. The threshold temperature will usually be greater than 90° F. Because the temperature sensor 42 will not be utilized while the vehicle is being driven, ambient temperature will not normally initiate the alert condition. However, the threshold temperature may be altered by the user to adjust for seasonal variations.

A transceiver 44 is mounted in the housing 12 and is electrically coupled to the microprocessor 18. The microprocessor 18 is configured to contact alert responders 46 with the transceiver 44 when the alert condition is initiated. The transceiver 44 transmits coordinates provided by the global positioning system 26. The transceiver 44 will utilize cellular band frequencies such that it can use cellular phone communication networks and towers 48. The transceiver 44 can be used in combination with the short range wireless communicator to communicate with a user's cellular phone 30.

A microphone 50 and a speaker 52 are each electrically coupled to the microprocessor 18 and are configured to allow communication with the alert responders 46 via the transceiver 44. In some embodiments, the microphone 50 and speaker 52 may also be used to communicate with the cellular phone 30. In some embodiments the sound emitter 36 may function as the speaker 52.

A panic button 54 may be mounted on the housing 12 and is electrically coupled to the microprocessor 18. The alert condition is initiated when the panic button 54 is actuated. While the panic button 54 may be used by a child who is being monitored by camera 32, the panic button 54 may more typically be engaged by an adult in the vehicle during an emergency situation and therefore does not require the first condition to be met in order to initiate the alert condition. Hover, the system 10 may be programmed such that the panic button 54 is only activated when the 14 vehicle is parked.

A display 56 is mounted on the front side 16 of the housing 12 and displays a status of the system 10 such as if the system 10 is active or in standby mode. The display 56 is electrically coupled to the microprocessor 18. A selector actuator 58 is mounted on the housing 12 and is electrically coupled to the microprocessor 18. The selector actuator is actuated to initiate operation of selected options and inputs of the system 10 and to connect it to a person's cellular phone 30 and/or vehicle 14. The selector actuator 58 may comprise a menu selector dial as is shown in the Figures, however, the display 56 may also function as a touchscreen having selector actuators displayed thereon. The display 56 is therefore used to indicate the options that are selectable by the user.

Additional features that the system 10 may include is a power button 60 operationally coupled to the microprocessor to turn the system 10 on or off. A dedicated sensor button 62 may be used to force the system 10 to utilize the motion sensor 34 and/or camera to capture an image with the camera 32. This would most typically be useful during the setup of the system 10 when acquiring the first images for facial recognition purposes. Other sensors, such smoke, CO, $CO_2$ and $O_2$ sensors may be incorporated into the system 10 such that it may be used for other purposes such on an airplane.

Figure 1:
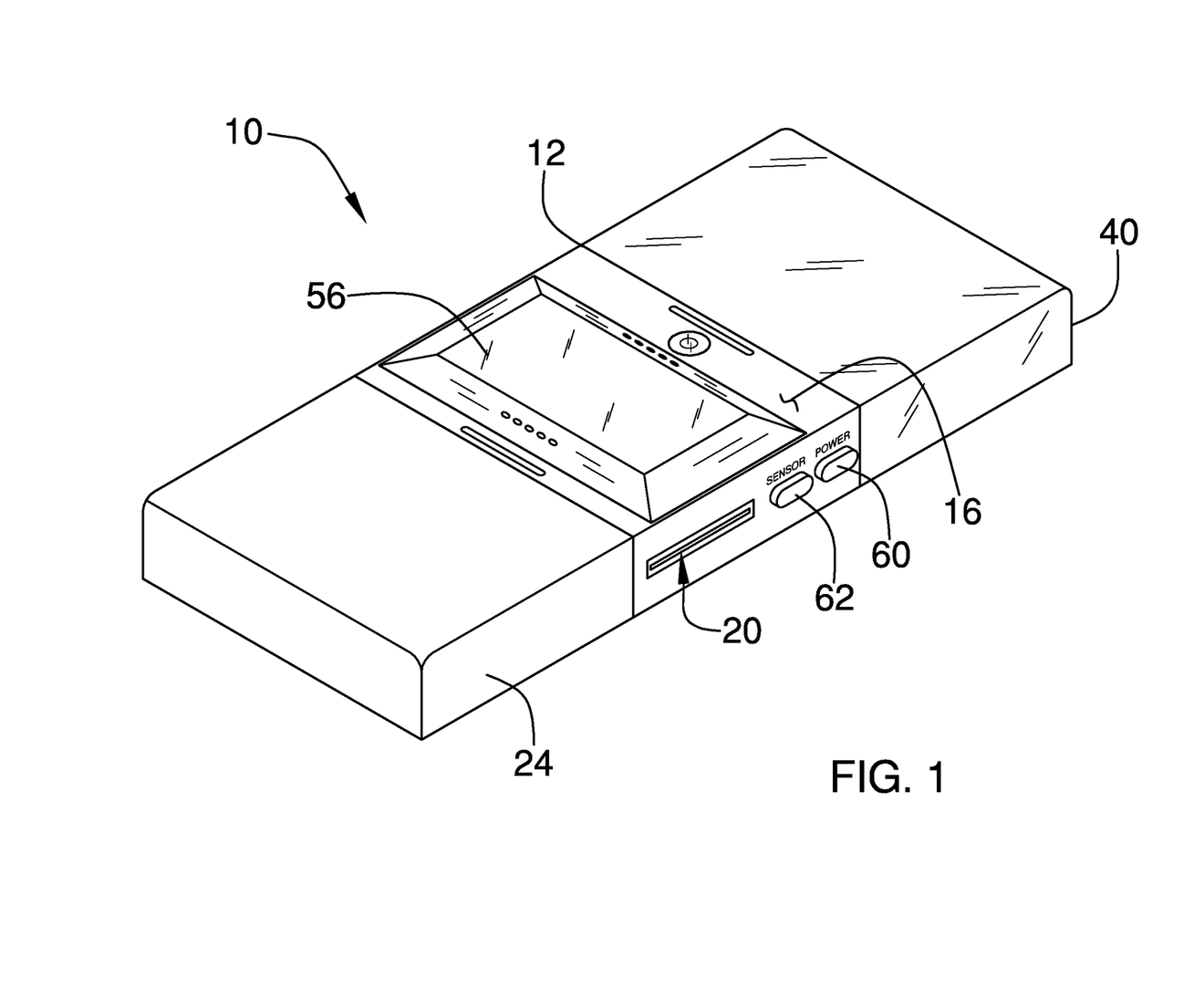
FIG. 1 is a front isometric view of a vehicle occupant detection system according to an embodiment of the disclosure.
Figure 2:
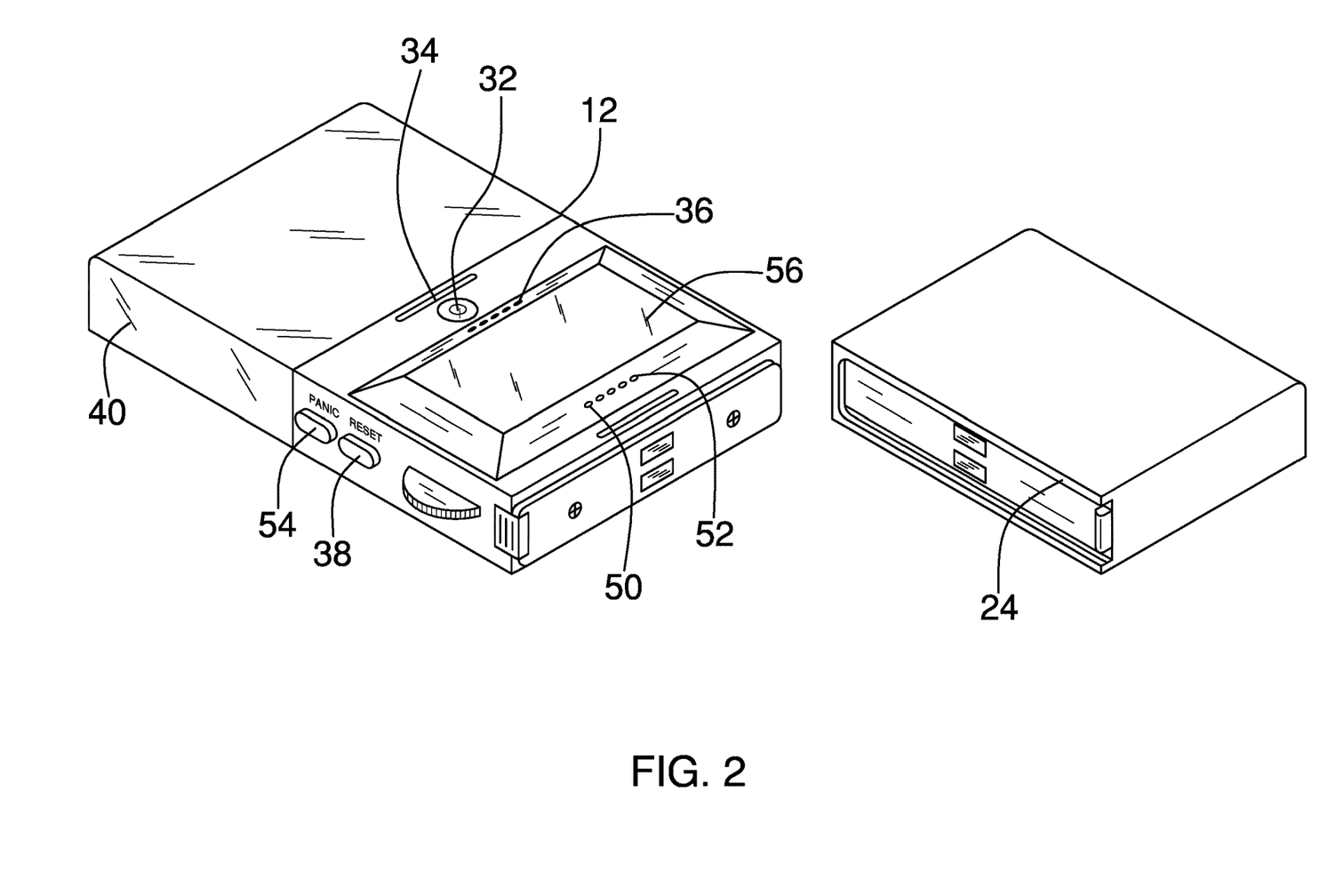
FIG. 2 is a rear isometric view of an embodiment of the disclosure.
Figure 3:
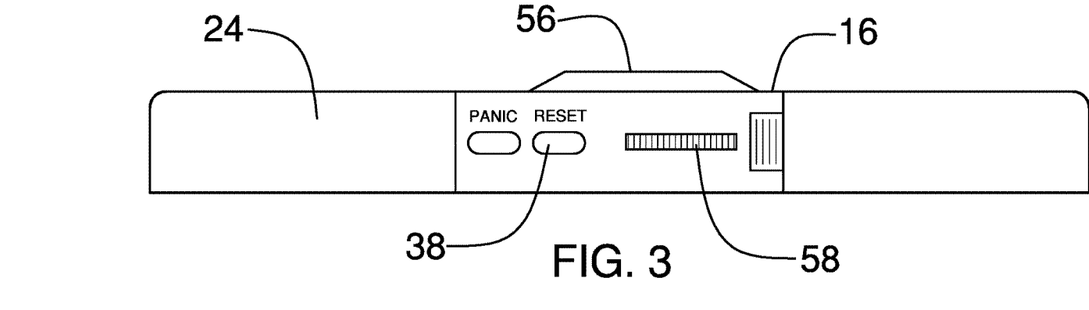
FIG. 3 is a right side view of an embodiment of the disclosure.
Figure 4:
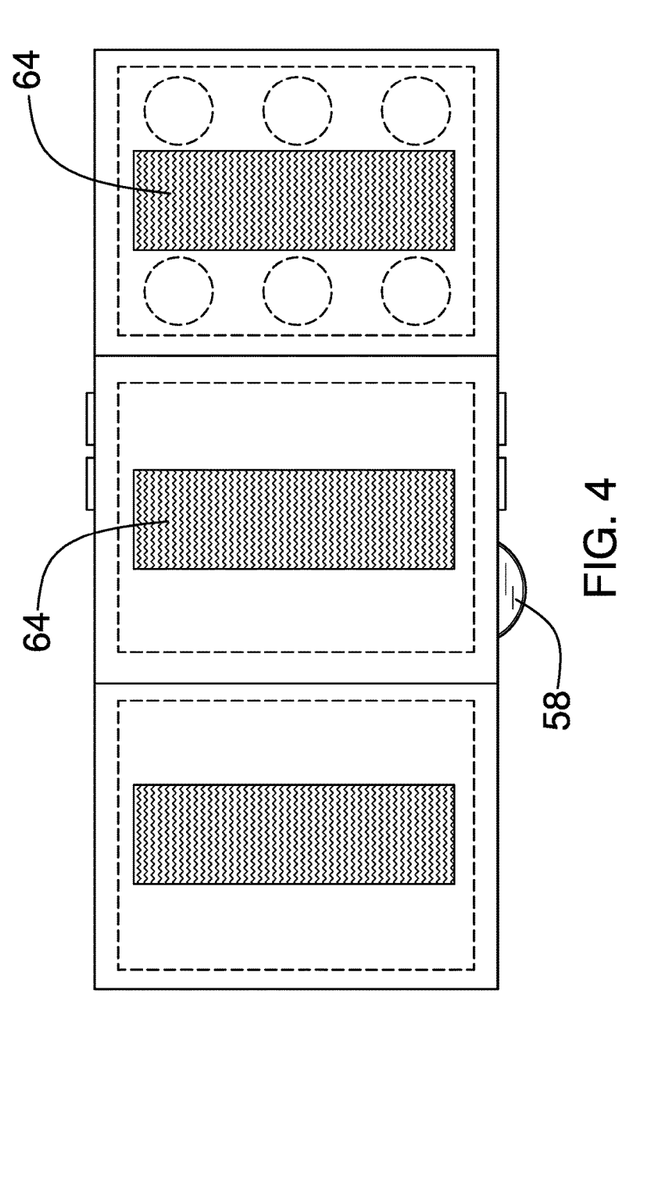
FIG. 4 is a rear view of an embodiment of the disclosure.
Figure 5:
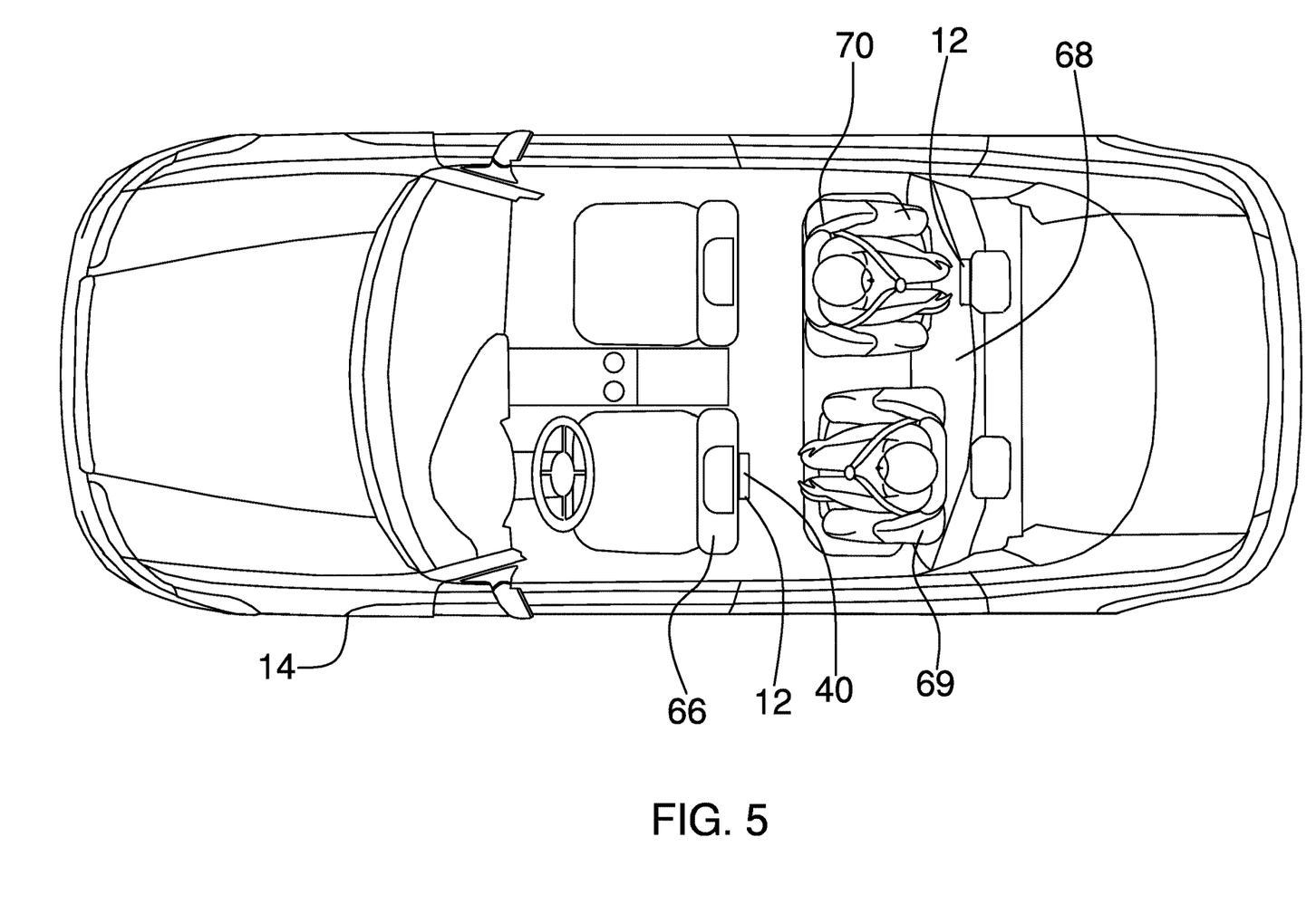
FIG. 5 is a top in-use view of an embodiment of the disclosure.
Figure 6:
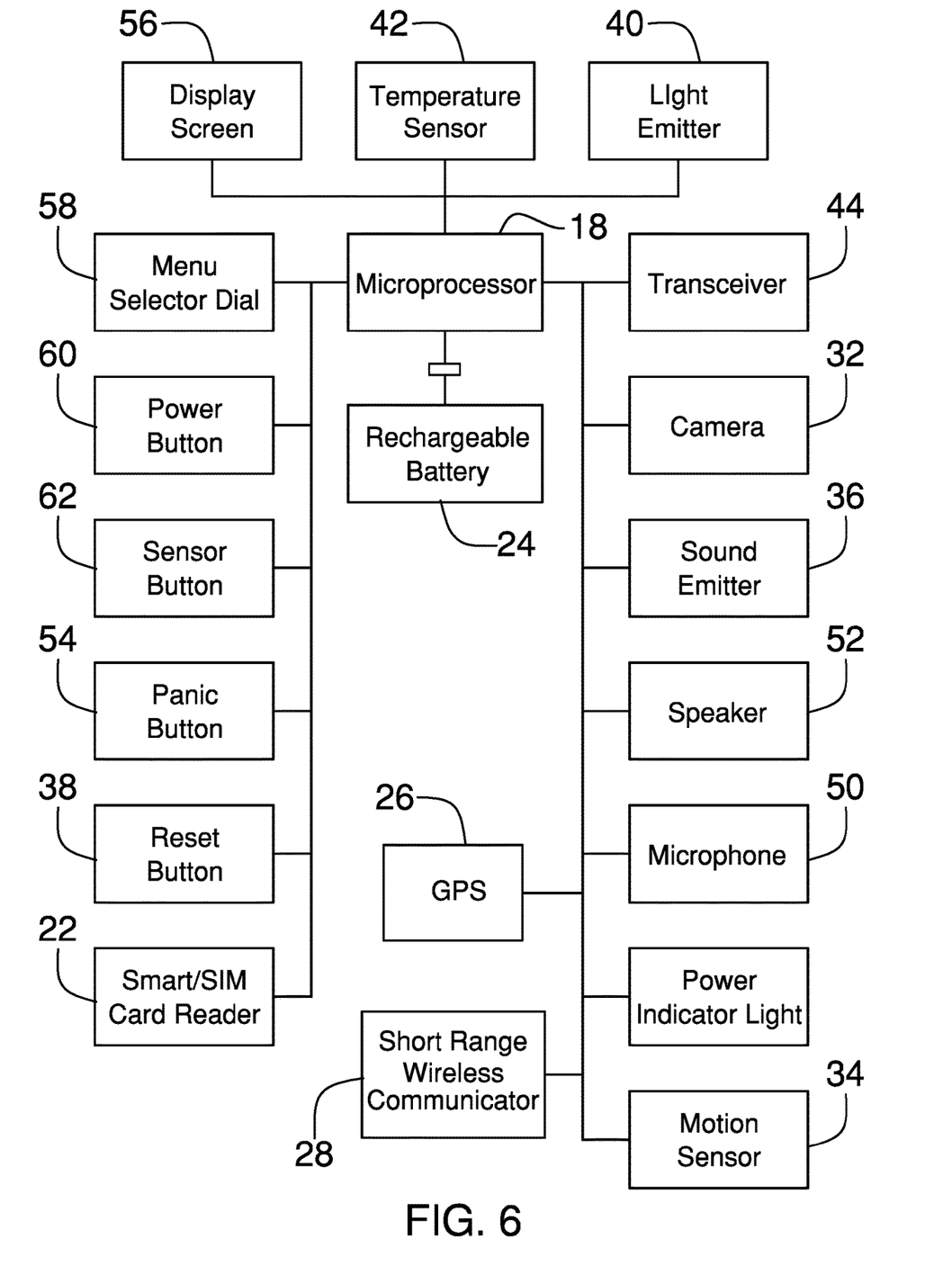
FIG. 6 is a schematic view of an embodiment of the disclosure.
Figure 7:
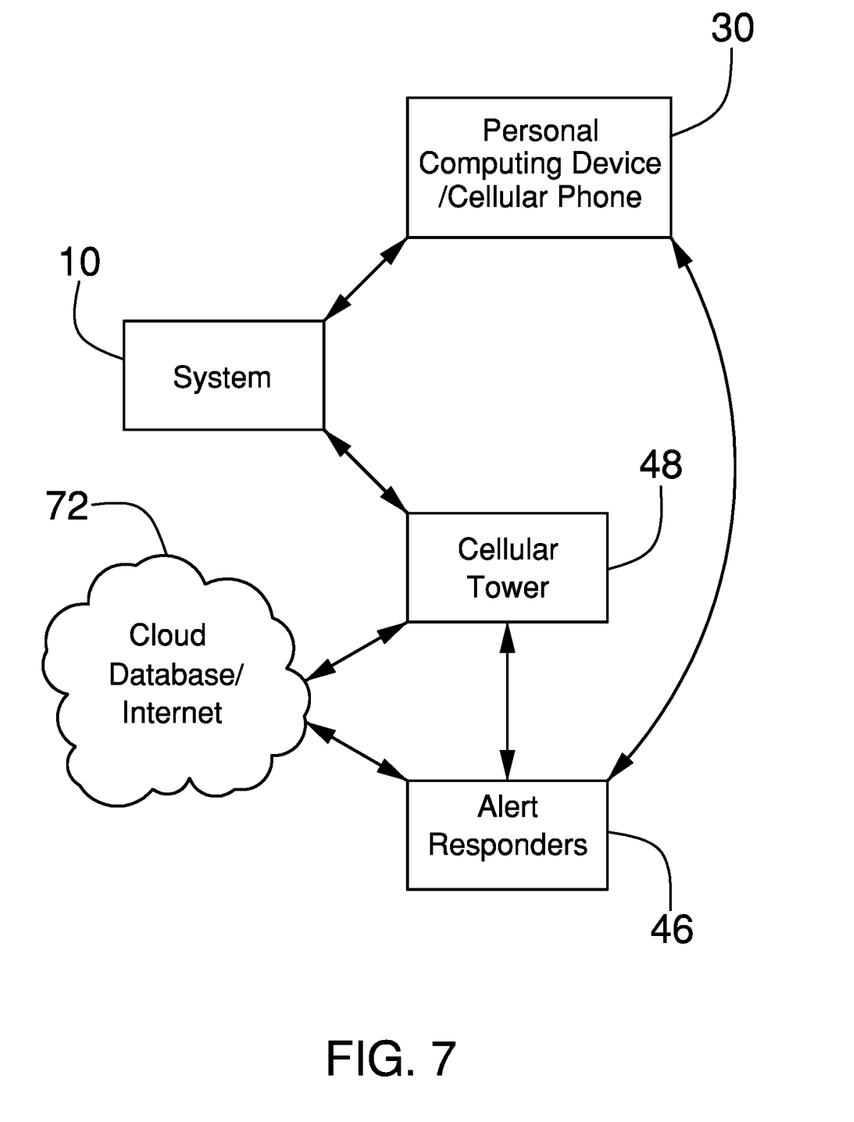
FIG. 7 is a schematic view of an embodiment of the disclosure.

In use, the housing 12 is mounted in a vehicle 14 using standard mounting assemblies such as hook and loop connectors 64, tethers, mechanical fasteners and the like. The housing 12 will be mounted on a back side of a vehicle 14 front seat 66 to direct the camera 32 at child in a forward facing car seat 69. The housing 12 will be mounted on the front side of a vehicle back seat 68 to direct the camera 32 toward a child in a rearward facing car seat 70. The user will then place an application on their cellular phone 30 to communicate with the microprocessor 18. The vehicle 14 can be connected to the microprocessor 18 directly by wireless communication directly or through the cellular phone 30. A child is placed in front of the camera 32 and the child is scanned by the camera 32 to build a facial recognition profile for later use by the system 10. Once the vehicle 14 is being driven, the system 10 will initiate a protocol waiting for the vehicle 14 to park. Once parked, the first condition will initiate and the sound emitter 36 will emit a short sound to remind the driver that a person is on the back seat 68 of the vehicle 14. Should the person delay in removing the child from the back seat 68, the second condition may be initiated which is louder such that a person near the vehicle 14, with the doors open, will easily hear the sound emitter 36. The third condition, if initiated, is intended to also capture the attention of any person's passing near the vehicle by attracting them to the vehicle 14 not only with the increased sound of the sound emitter 36 but the flashing of the light emitter 40. Alert responders 46 will also be contacted if the third condition is initiated. The alert responders 46 may comprise municipal responders or a service that relays the message to municipal responders. The service may be preferred as it can also contact the owner of the cellular phone 30 and access additional data from an internet based database 72. Additionally, the third condition may be utilized to alert the cellular phone 30 directly by way of a telephone call or an alert through the application using short range communications or long range cellular communications.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An in-vehicle child detection system positionable within a vehicle and configured to warn a person that a child is positioned within the vehicle, the system comprising:
   a housing;
   a microprocessor being mounted in the housing, the microprocessor being programmed to detect an engine engagement status of the vehicle;
   a camera being mounted on the housing and being directed forward of the housing, the camera being electrically coupled to the microprocessor and being programmed with facial recognition software to compare facial images against images captured by the camera;
   a motion sensor being mounted on the housing, the motion sensor being configured to detect motion forward of the housing, the camera capturing an image when the motion sensor detects motion;
   a first condition being defined when the motion sensor detects motion, the camera captures an image prompting a facial recognition match, and the microprocessor detects the vehicle is parked;
   a sound emitter being mounted on the housing and being electrically coupled to the microprocessor, the sound emitter emitting a low decibel sound when the first condition is first attained; and
   a second condition being defined after the first condition has been maintained for a first pre-selected amount of time the sound emitter emitting a medium decibel sound when the second condition is attained.

2. The in-vehicle child detection system according to claim 1, further including an alert condition being defined after the second condition has been maintained for a second pre-selected amount of time, the sound emitter emitting a high decibel sound when the alert condition is attained.

3. The in-vehicle child detection system according to claim 1, further including an alert condition being defined after the first condition has been maintained for a second pre-selected amount of time, the sound emitter emitting a high decibel sound when the alert condition is attained.

4. The in-vehicle child detection system according to claim 3, wherein a standby condition being defined when a facial recognition match is nil after the first condition is attained, the standby condition resetting the system to prevent the first and alert conditions until the microprocessor detects the vehicle is being driven.

5. The in-vehicle child detection system according to claim 3, further including a light emitter configured to emit a strobing light being mounted on the housing and being electrically coupled to the microprocessor, the light emitter being turned on when the alert condition has been met.

6. The in-vehicle child detection system according to claim 3, further including a temperature sensor being electrically coupled to the microprocessor and being mounted on the housing, the alert condition being initiated when the temperature sensor detects a threshold temperature and the first or second conditions have been met.

7. The in-vehicle child detection system according to claim 3, further including:
a global positioning system being mounted in the housing and being electrically coupled to the microprocessor; and
a transceiver being mounted in the housing and being electrically coupled to the microprocessor, the microprocessor being configured to contact alert responders with the transceiver when the alert condition is initiated, the transceiver transmitting coordinates provided by the global positioning system.

8. The in-vehicle child detection system according to claim 7, further including a microphone and a speaker each being electrically coupled to the microprocessor and being configured to allow communication with the alert responders via the transceiver.

9. The in-vehicle child detection system according to claim 8, further including a panic button being mounted on the housing and being electrically coupled to the microprocessor, the alert condition being initiated when the panic button is actuated.

10. The in-vehicle child detection system according to claim 3, further including a panic button being mounted on the housing and being electrically coupled to the microprocessor, the alert condition being initiated when the panic button is actuated.

11. The in-vehicle child detection system according to claim 7, further including a light emitter configured to emit a strobing light being mounted on the housing and being electrically coupled to the microprocessor, the light emitter being turned on when the alert condition has been met.

12. The in-vehicle child detection system according to claim 7, further including a temperature sensor being electrically coupled to the microprocessor and being mounted on the housing, the alert condition being initiated when the temperature sensor detects a threshold temperature and the first conditions has been met.

13. The in-vehicle child detection system according to claim 7, further including a panic button being mounted on the housing and being electrically coupled to the microprocessor, the alert condition being initiated when the panic button is actuated.

14. An in-vehicle child detection system positionable within a vehicle and configured to warn a person that a child is positioned within the vehicle, the system comprising:
a housing;
a microprocessor being mounted in the housing, the microprocessor being programmed to detect an engine engagement status of the vehicle;
a camera being mounted on the housing and being directed forward of the housing, the camera being electrically coupled to the microprocessor and being programmed with facial recognition software to compare facial images against images captured by the camera;
a motion sensor being mounted on the housing, the motion sensor being configured to detect motion forward of the housing, the camera capturing an image when the motion sensor detects motion;
a first condition being defined when the motion sensor detects motion, the camera captures an image prompting a facial recognition match, and the microprocessor detects the vehicle is parked;
a sound emitter being mounted on the housing and being electrically coupled to the microprocessor, the sound emitter emitting a low decibel sound when the first condition is first attained;
a second condition being defined after the first condition has been maintained for a first pre-selected amount of time, the sound emitter emitting a medium decibel sound when the second condition is attained;
an alert condition being defined after the second condition has been maintained for a second pre-selected amount of time, the sound emitter emitting a high decibel sound when the alert condition is attained;
a standby condition being defined when a facial recognition match is nil after the first condition is attained, the standby condition resetting the system to prevent the first, second and alert conditions until the microprocessor detects the vehicle is being driven;
a light emitter configured to emit a strobing light being mounted on the housing and being electrically coupled to the microprocessor, the light emitter being turned on when the alert condition has been met;
a temperature sensor being electrically coupled to the microprocessor and being mounted on the housing, the alert condition being initiated when the temperature sensor detects a threshold temperature and the first or second conditions have been met;
a global positioning system being mounted in the housing and being electrically coupled to the microprocessor;
a transceiver being mounted in the housing and being electrically coupled to the microprocessor, the microprocessor being configured to contact alert responders with the transceiver when the alert condition is initiated, the transceiver transmitting coordinates provided by the global positioning system;
a microphone and a speaker each being electrically coupled to the microprocessor and being configured to allow communication with the alert responders via the transceiver;
a panic button being mounted on the housing and being electrically coupled to the microprocessor, the alert condition being initiated when the panic button is actuated;
a display being mounted on a front side of the housing and displaying a status of the system, the display being electrically coupled to the microprocessor; and
a selector actuator being mounted on the housing and being electrically coupled to the microprocessor, the selector being actuated to initiate operation of selected options of the system.

* * * * *